(12) United States Patent
Kawamura et al.

(10) Patent No.: US 10,190,010 B2
(45) Date of Patent: Jan. 29, 2019

(54) INK, INK CARTRIDGE, AND IMAGE RECORDING METHOD

(71) Applicant: CANON KABUSHIKI KAISHA, Tokyo (JP)

(72) Inventors: Hidetaka Kawamura, Yokohama (JP); Masahiro Terada, Hadano (JP); Akihiro Taya, Yokohama (JP); Yohei Masada, Tokyo (JP); Masanobu Ootsuka, Tokyo (JP); Takaharu Aotani, Tokyo (JP); Yutaka Yoshimasa, Yokohama (JP); Shoji Koike, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 104 days.

(21) Appl. No.: 15/281,141

(22) Filed: Sep. 30, 2016

(65) Prior Publication Data

US 2017/0210926 A1   Jul. 27, 2017

(30) Foreign Application Priority Data

Jan. 22, 2016   (JP) .................... 2016-010907
Apr. 25, 2016   (JP) .................... 2016-086817

(51) Int. Cl.
| | |
|---|---|
| *B41J 2/01* | (2006.01) |
| *C09D 11/38* | (2014.01) |
| *C09D 11/102* | (2014.01) |
| *C09D 11/322* | (2014.01) |
| *C09D 11/36* | (2014.01) |

(52) U.S. Cl.
CPC ............... *C09D 11/38* (2013.01); *B41J 2/01* (2013.01); *C09D 11/102* (2013.01); *C09D 11/322* (2013.01); *C09D 11/36* (2013.01)

(58) Field of Classification Search
None
See application file for complete search history.

(56) References Cited

U.S. PATENT DOCUMENTS

| | | | |
|---|---|---|---|
| 4,557,761 A | 12/1985 | Kobayashi et al. | |
| 4,632,703 A | 12/1986 | Koike et al. | |
| 4,661,158 A | 4/1987 | Kobayashi et al. | |
| 4,689,078 A | 8/1987 | Koike et al. | |
| 4,702,742 A | 10/1987 | Iwata et al. | |
| 4,725,849 A | 2/1988 | Koike et al. | |
| 4,838,938 A | 6/1989 | Tomida et al. | |

(Continued)

FOREIGN PATENT DOCUMENTS

JP   H05-179183 A   7/1993

OTHER PUBLICATIONS

US 5,123,959, 06/1992, Fukushima et al. (withdrawn)

(Continued)

*Primary Examiner* — Erica Lin
(74) *Attorney, Agent, or Firm* — Venable LLP (57) ABSTRACT

Provided is an ink containing a pigment, a water-soluble organic solvent, and a surfactant, and having a viscosity at 25° C. of 5 mPa·s or more. The ink has a static surface tension of 30.5 mN/m or more to 35.0 mN/m or less, which is measured at 25° C. by a Wilhelmy method. The ink also has a dynamic surface tension at a bubble life time of 150 msec of 30.5 mN/m or more to 37.0 mN/m or less, which is measured at 25° C. by a maximum bubble pressure method.

14 Claims, 1 Drawing Sheet

(56) References Cited

U.S. PATENT DOCUMENTS

| | | |
|---|---|---|
| 4,849,770 A | 7/1989 | Koike et al. |
| 4,853,036 A | 8/1989 | Koike et al. |
| 4,923,515 A | 5/1990 | Koike et al. |
| 4,957,553 A | 9/1990 | Koike et al. |
| 4,965,609 A | 10/1990 | Tomida et al. |
| 4,965,612 A | 10/1990 | Sakaki et al. |
| 4,969,951 A | 11/1990 | Koike et al. |
| 4,973,499 A | 11/1990 | Iwata et al. |
| 4,986,850 A | 1/1991 | Iwata et al. |
| 5,017,227 A | 5/1991 | Koike et al. |
| 5,053,078 A | 10/1991 | Koike et al. |
| 5,067,980 A | 11/1991 | Koike et al. |
| 5,075,699 A | 12/1991 | Koike et al. |
| 5,099,255 A | 3/1992 | Koike et al. |
| 5,101,217 A | 3/1992 | Iwata et al. |
| 5,118,351 A | 6/1992 | Shirota et al. |
| 5,124,718 A | 6/1992 | Koike et al. |
| 5,141,558 A | 8/1992 | Shirota et al. |
| 5,151,128 A | 9/1992 | Fukushima et al. |
| 5,190,581 A | 3/1993 | Fukushima et al. |
| 5,220,347 A | 6/1993 | Fukushima et al. |
| 5,221,333 A | 6/1993 | Shirota et al. |
| 5,221,334 A | 6/1993 | Ma et al. |
| 5,248,991 A | 9/1993 | Shirota et al. |
| 5,250,121 A | 10/1993 | Yamamoto et al. |
| 5,254,157 A | 10/1993 | Koike et al. |
| 5,257,036 A | 10/1993 | Koike et al. |
| 5,258,066 A | 11/1993 | Kobayashi et al. |
| 5,296,022 A | 3/1994 | Kobayashi et al. |
| 5,329,305 A | 7/1994 | Fukushima et al. |
| 5,358,558 A | 10/1994 | Yamamoto et al. |
| 5,380,358 A | 1/1995 | Aoki et al. |
| 5,396,275 A | 3/1995 | Koike et al. |
| 5,468,553 A | 11/1995 | Koike et al. |
| 5,494,733 A | 2/1996 | Koike et al. |
| 5,500,023 A | 3/1996 | Koike et al. |
| 5,515,093 A | 5/1996 | Haruta et al. |
| 5,540,764 A | 7/1996 | Haruta et al. |
| 5,594,485 A | 1/1997 | Koike et al. |
| 5,645,631 A | 7/1997 | Koike et al. |
| 5,658,376 A | 8/1997 | Noguchi et al. |
| 5,686,951 A | 11/1997 | Koike et al. |
| 5,698,478 A | 12/1997 | Yamamoto et al. |
| 5,718,793 A | 2/1998 | Inamoto et al. |
| 5,764,261 A | 6/1998 | Koike et al. |
| 5,781,216 A | 7/1998 | Haruta et al. |
| 5,782,967 A | 7/1998 | Shirota et al. |
| 5,902,387 A | 5/1999 | Suzuki et al. |
| 5,922,625 A | 7/1999 | Haruta et al. |
| 6,033,066 A | 3/2000 | Koike et al. |
| 6,036,307 A | 3/2000 | Hakamada et al. |
| 6,139,939 A | 10/2000 | Haruta et al. |
| 6,214,963 B1 | 4/2001 | Noguchi et al. |
| 6,394,597 B1 | 5/2002 | Koike et al. |
| 6,398,355 B1 | 6/2002 | Shirota et al. |
| 6,426,766 B1 | 7/2002 | Shirota et al. |
| 6,474,803 B1 | 11/2002 | Shirota et al. |
| 6,552,156 B2 | 4/2003 | Noguchi et al. |
| 6,613,821 B2 | 9/2003 | Suzuki et al. |
| 6,619,791 B2 | 9/2003 | Tochihara et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,874,881 B2 | 4/2005 | Suzuki et al. |
| 6,932,467 B2 | 8/2005 | Kawamura |
| 7,029,109 B2 | 4/2006 | Shirota et al. |
| 7,055,943 B2 | 6/2006 | Suzuki et al. |
| 7,141,105 B2 | 11/2006 | Udagawa et al. |
| 7,144,449 B2 | 12/2006 | Udagawa et al. |
| 7,185,978 B2 | 3/2007 | Nagashima et al. |
| 7,306,664 B2 | 12/2007 | Kato et al. |
| 7,429,291 B2 | 9/2008 | Udagawa et al. |
| 7,449,056 B2 | 11/2008 | Kato et al. |
| 7,464,965 B2 | 12/2008 | Udagawa et al. |
| 7,605,124 B2 | 10/2009 | Masada et al. |
| 7,611,570 B2 | 11/2009 | Koike et al. |
| 7,641,723 B2 | 1/2010 | Koike et al. |
| 7,827,982 B2 | 11/2010 | Masada et al. |
| 7,926,931 B2 | 4/2011 | Katsuragi et al. |
| 8,029,609 B2 | 10/2011 | Masada et al. |
| 8,308,198 B2 | 11/2012 | Udagawa et al. |
| 8,328,341 B2 | 12/2012 | Koike et al. |
| 8,328,926 B2 | 12/2012 | Koike et al. |
| 8,408,691 B2 | 4/2013 | Koike et al. |
| 8,506,067 B2 | 8/2013 | Koike et al. |
| 2007/0221215 A1 | 9/2007 | Sugita et al. |
| 2013/0068131 A1 | 3/2013 | Bermel et al. |
| 2013/0155144 A1 | 6/2013 | Kunimine et al. |
| 2013/0222462 A1 | 8/2013 | Okubo et al. |
| 2013/0307912 A1* | 11/2013 | Masuda ............... C09D 11/38 347/100 |
| 2014/0204156 A1* | 7/2014 | Gotou ............... B41J 2/01 347/100 |
| 2014/0253618 A1 | 9/2014 | Masuda et al. |
| 2014/0313265 A1 | 10/2014 | Himura et al. |
| 2014/0364548 A1 | 12/2014 | Everhardus et al. |
| 2015/0035896 A1 | 2/2015 | Gotou et al. |

OTHER PUBLICATIONS

Nov. 28, 2016 European Search Report in European Patent Appln. No. 16191817.2.

"Method of Testing Paper and Paperboard for their Liquid-Absorbing Properties", Japan TAPPI Paper Pulp Test Method, No. 51, pp. 1-6.

* cited by examiner

FIG. 1

FIG. 2

INK, INK CARTRIDGE, AND IMAGE RECORDING METHOD

BACKGROUND OF THE INVENTION

Field of the Invention

The present invention relates to an ink, an ink cartridge; and an image recording method.

Description of the Related Art

An ink jet recording method is one of the image recording methods that have been significantly developing in recent years because a high-quality color image can be easily recorded by the method despite the fact that its principle is simple. In addition, the method has rapidly become widespread not only in the image recording of a document, a photograph, and the like in households that has heretofore been mainstream but also in offices and industrial applications.

In the case of a printer for a household or for an office, printing is performed by scanning the recording surface of a recording medium with a short serial type head a plurality of times, and hence a printing speed is limited. Meanwhile, a long line type head has been developed in recent years. When a recording apparatus, such as a printer, mounted with such line type head is used, an image of a size corresponding to a head width can be recorded by one scan (one pass). Accordingly, the ink jet recording method has started to be adopted also in a commercial printing industry where printing at higher speed, is required.

In the commercial printing industry, it is necessary that a large amount of images can be printed at lower cost. Accordingly, it has been desired that a high-quality image can be recorded not only on inexpensive and thin paper that has been generally called printing paper and has been widely used but also on thin paper free of an ink-receiving layer that has been called plain paper.

In the recording of an image on the plain paper, fixability showing a time period from the time point when an ink applied to the recording medium is brought into contact with a member in a recording apparatus, such as a conveying roller, to the time point when the ink stops contaminating the member, and the optical density of the image have heretofore been important setting items. Meanwhile, inks that have been sold in the market are roughly classified into a so-called superpermeable ink (ink having high permeability into the recording medium) placing emphasis on the fixability, and a so-called overlay ink (ink having low permeability into the recording medium) placing emphasis on the optical density of the image.

The superpermeable ink contains a large amount of a permeable solvent (e.g., a glycol ether or a diol), and an ink droplet applied to the surface of the recording medium (plain paper) permeates a gap between cellulose fibers constituting the plain paper. The ink has a feature of having a quick permeation time of the order of milliseconds.

In the overlay ink, an ink droplet applied to the surface of the recording medium permeates a cellulose fiber itself, and hence its permeation time into the recording medium is at a level of several seconds. Accordingly, a coloring material remains in a portion relatively close to the surface of the recording medium, and hence the optical density can be efficiently increased. In Japanese Patent Application Laid-open No. H05-179183, there is a disclosure of an overlay ink whose pigment fixes to the vicinity of the surface of plain paper.

SUMMARY OF THE INVENTION

The present invention is directed to the provision of an ink capable of recording an image that achieves both an optical density and fixability at high levels, and that is suppressed in feathering and strike-through. The present invention is also directed to the provision of an ink cartridge and an image recording method each using the ink.

According to one aspect of the present invention, there is provided an ink, including a pigment, a water-soluble organic solvent, and a surfactant, wherein the ink has a viscosity of 5 mPa·s or more at 25° C.;

a static surface tension of the ink as measured at 25° C. using a Wilhelmy method is from 30.5 mN/m to 35.0 mN/m; and a dynamic surface tension of the ink as measured at 25° C. using a maximum bubble pressure method is from 30.5 mN/m to 37.0 mN/m when a bubble life time is 150 msec.

In other words, the present invention provides an ink, including a pigment, a water-soluble organic solvent, and a surfactant, the ink having:

a viscosity at 25° C. of 5 mPa·s or more;

a static surface tension of 30.5 mN/m or more to 35.0 mN/m or less, which is measured at 25° C. by a Wilhelmy method; and a dynamic surface tension at a bubble life time of 150 msec of 30.5 mN/m or more to 37.0 mN/m or less, which is measured at 25° C. by a maximum bubble pressure method.

According to another aspect of the present invention, there is provided an ink cartridge, including an ink and an ink storage portion configured to store the ink, the ink including the above-mentioned ink.

According to still another aspect of the present invention, there is provided an image recording method, including an ink-applying step of applying an ink to a recording medium, the ink including the above-mentioned ink.

Further features of the present invention will become apparent from the following description of exemplary embodiments with reference to the attached drawings.

DESCRIPTION OF THE EMBODIMENTS

It can be said that the superpermeable ink is suitable for high-speed recording because the ink quickly permeates a recording medium (plain paper). Meanwhile, the ink has involved the following problem: a phenomenon in which the ink bleeds along a fiber of the paper (hereinafter sometimes referred to as "feathering") occurs, or the optical density of an image is liable to reduce. It is probably because a coloring material permeates from the surface of the recording medium to its back that the optical density of the image is liable to reduce. A possible approach to increasing the optical density of the image in the high-speed recording is to increase the concentration of the coloring material in the ink. However, in an ink jet ink, when the concentration of a coloring material in the ink is increased, the coloring material is liable to precipitate in the vicinity of a nozzle orifice in a recording apparatus. As a result, an ejection failure phenomenon in which the ink cannot be ejected is liable to occur, and hence the increase in concentration of the coloring material in the ink is limited. In addition, the use of the superpermeable ink may cause so-called strike-through in which an image is seen through from the rear surface of a recording medium. From the foregoing viewpoint, it is difficult to increase the optical density of the image in the case where the superpermeable ink is used.

Meanwhile, as a result of their investigation, the inventors of the present invention have found that an overlay ink, such as the ink disclosed in Japanese Patent Application Laid-Open No. H05-179183, has low fixability and is at a level insufficient for the high-speed recording, though the ink can record an image having a high optical density. For example, in order that sufficient color development may be obtained in plain paper, about 1 mg of an ink needs to be applied per square centimeter of the plain paper, but when one-pass recording is performed at a conveying speed (also referred, to as "transferring speed") of the plain paper as high as 75 m/min or more, a conveying roller (also referred to as "transferring roller") with which the ink has been brought into contact immediately after the recording is contaminated in some cases.

The inventors of the present invention have made extensive investigations with a view to providing an ink capable of recording an image that achieves both an optical density and fixability at high levels, and that is suppressed in feathering and strike-through, and as a result, have accomplished the present invention.

Embodiment of the present invention are described below, but the present invention is not limited to the following embodiments. Various physical property values herein are values at normal temperature (25° C.) unless otherwise stated.

The inventors of the present invention have paid attention to the following problem: when one-pass recording is performed with an overlay ink at a conveying speed of a recording medium as high as 75 m/min or more, a conveying roller in a recording apparatus is contaminated owing to low fixability of the ink. Then, the inventors of the present invention have considered that in order that the fixability of the ink to the recording medium may be improved, the permeation time of the ink into the recording medium needs to be shortened to about 1 second, which is shorter than that of a conventional overlay ink.

Meanwhile, ink jet heads to be used in the high-speed recording have been placed on the market from, for example, Aprion, Scitex Vision (Hewlett-Packard Company), Spectra, Xaar, Ricoh, Kyocera, and Seiko. In each of those ink jet heads, in ordinary cases, the use of an ink having a viscosity at 25° C. in the range of from 5 mPa·s or more to 15 mPa·s or less has been mainstream. Such ink having a relatively high viscosity has an advantage in that its coalescence hardly occurs on a recording medium in addition to an advantage in that its ejection stability is high. In the coalescence, ink droplets immediately after the application of the ink to the recording medium are brought into contact with each other, and hence the spread of the ink, i.e., its bleeding ratio reduces. Accordingly, the coalescence is responsible for a reduction in graininess or the occurrence of a stripe in an image. In the high-speed recording, it is inevitable that the ink droplets crowd in a short time period to fix to the recording medium. Accordingly, the viscosity of the ink is desirably 5 mPa·s or more for preventing the coalescence. However, such ink having a relatively high viscosity hardly permeates a recording medium. Accordingly, in order that the permeation time of the ink into the recording medium may be shortened to about 1 second, which is shorter than that of a conventional overlay ink of a low-viscosity type, a permeation time-controlling technology more sophisticated than a conventional technology is needed.

A static surface tension has heretofore been known as a physical property involved in the control of the permeation time of an ink into a recording medium. The inventors of the present invention have made the following attempt for achieving both the optical density and fixability of an image: the permeability of an ink droplet into a cellulose fiber in a recording medium (plain paper) is improved by adjusting the static surface tension of the ink through the use of various solvents and surfactants. As a result, the inventors have found that some of the inks each having a permeation time of about 1 second needed for the high-speed recording provide different optical densities of images despite the fact that the inks have the same static surface tension.

In view of the foregoing, the inventors of the present invention have continuously made extensive investigations, and as a result, have considered that it is important to control not only the static surface tension of an ink but also the dynamic surface tension thereof. Based on the foregoing, the inventors have made a further investigation. As a result, the inventors have found that as long as the dynamic surface tension of the ink within a short time period is adjusted to fall within a specific range suitable for the high-speed recording, even when the ink is an overlay ink, the ink is excellent in fixability to a recording medium and hence the contamination of a conveying roller can be prevented, and an image having a high optical density is obtained.

<Ink>

That is, an ink of the present invention contains a pigment, a water-soluble organic solvent, and a surfactant, and has a viscosity at 25° C. of 5 mPa·s or more. In addition, the ink of the present invention has a static surface tension of 30.5 mN/m or more to 35.0 mN/m or less, and a dynamic surface tension at a bubble life time of 150 msec of 30.5 mN/m or more to 37.0 mN/m or less. The static surface tension is a value measured at 25° C. by a Wilhelmy method. The dynamic surface tension is a value measured at 25° C. by a maximum bubble pressure method.

The ink of the present invention having the above-mentioned constructions can record an image that strikes a balance between optical density and fixability at high levels, and that is suppressed in strike-through. The mechanism via which the effect is obtained is considered to be as described below.

When a droplet of the ink of the present invention is applied to a recording medium (plain paper), the droplet permeates a cellulose fiber itself constituting the recording medium. Such permeation of the ink droplet into the cellulose fiber itself as observed in the conventional overlay ink has been considered to be affected by the static surface tension of the ink droplet. However, in consideration of adaptability to high-speed recording, in order that the permeation time of the ink droplet into the recording medium may be set to about 1 second, attention needs to be paid to a dynamic surface tension within a short time period immediately after the application of the ink droplet to the recording medium.

On the surface of an ink droplet ejected from an ink jet nozzle to be applied to a recording medium, the oriented state of the surfactant in the ink droplet collapses owing to impact and the deformation of the shape of the droplet at the time of the application to the recording medium. Accordingly, the dynamic surface tension of the ink droplet at the time of the application of the droplet to the recording medium becomes much higher than its static surface tension. After that, the extent to which the surfactant is oriented toward the surface of the droplet rises and the dynamic surface tension of the ink reduces, and hence the permeation of the ink into the recording medium starts. As described in the foregoing, an overlay ink suitable for high-speed recording needs to permeate within about 1 second after its application to a recording medium. To this end, it is necessary that the dynamic surface tension of the ink abruptly reduce immediately after the application of the ink to the recording medium, and become a sufficiently low value 150 msec after the application of the ink to the recording medium.

In contrast, in the case where the dynamic surface tension of the ink 150 msec after the application of the ink to the recording medium is a value as high as more than 37.0 mN/m, it takes a long time period for the ink to permeate the recording medium, and hence fixability reduces. Meanwhile, in the case where the dynamic surface tension of the ink 150 msec after the application of the ink to the recording medium is a value as low as less than 30.5 mN/m, the ink permeates a gap between cellulose fibers depending on the kind of paper. Accordingly, in this case, as in a conventional superpermeable ink, a sufficient optical density cannot be obtained. Accordingly, the ink needs to be designed while attention is paid so that not only the static surface tension but also the dynamic surface tension 150 msec after the application of the ink to the recording medium may fall within a moderate range.

As described above, an ink containing a pigment, a water-soluble organic solvent, and a surfactant, having a viscosity at 25° C. of 5 mPa·s or more, and having a specific static surface tension and a specific dynamic surface tension is used. That is, the following ink is used: the ink has a static surface tension measured by the Wilhelmy method of 30.5 mN/m or more to 35.0 mN/m or less, and a dynamic surface tension measured by the maximum bubble pressure method at a bubble life time of 150 msec of 30.5 mN/m or more to 37.0 mN/m or less. The ink can cause the pigment to remain in the vicinity of the surface of a recording medium. When the respective constructions in the ink synergistically act on each other as described above, an image that strikes a balance between optical density and fixability at high levels, and that is suppressed in strike-through can be recorded. Accordingly, the ink of the present invention can be suitably used in an ink jet recording apparatus that can perform high-speed recording in which the conveying speed of the recording medium is 75 m/min or more, and can be suitably used in an ink jet recoding apparatus that can record an image at the conveying speed by one pass. Further, the ink of the present invention can be suitably used in a high-speed continuous form printer.

(Physical Properties of Ink)

The viscosity of the ink of the present invention at 25° C. is 5 mPa·s or more. When the viscosity of the ink is 5 mPa·s or more, the ink has high ejection stability and its coalescence hardly occurs on a recording medium. From the foregoing viewpoint, the viscosity of the ink at 25° C. is preferably 5.5 mPa·s or more. An upper limit for the viscosity of the ink at 25° C. is preferably 17.0 mPa·s or less, more preferably 15.0 mPa·s or less from the viewpoint of the continuous ejection stability of the ink. In the specification, the viscosity of the ink is a value measured at 25° C. with a rotational viscometer.

The static surface tension of the ink of the present invention measured at 25° C. by the Wilhelmy method (also referred to as "plate method" or "vertical plate method") is 30.5 mN/m or more to 35.0 mN/m or less. When the static surface tension of the ink is more than 35.0 mN/m, there is a fear that an ink droplet applied to a recording medium does not spread but becomes smaller. In addition, when the static surface tension of the ink is less than 30.5 mN/m, in some of various kinds of plain paper, there is a fear that a phenomenon in which the ink bleeds along a paper fiber (so-called feathering) occurs. From the viewpoint that an image further suppressed in feathering is obtained, the static surface tension of the ink is preferably 31.0 mN/m or more.

The dynamic surface tension of the ink of the present invention measured at 25° C. by the maximum bubble pressure method is 30.5 mN/m or more to 37.0 mN/m or less at a bubble life time of 150 msec. When the dynamic surface tension of the ink is less than 30.5 mN/m, strike-through is liable to occur. From the viewpoint that an image further suppressed in strike-through is obtained, the dynamic surface tension of the ink is preferably 31.0 mN/m or more, more preferably 31.5 mN/m or more. In addition, when the dynamic surface tension of the ink is more than 37.0 mN/m, in some of various kinds of plain paper, the permeation time of the ink into the plain paper lengthens and hence the fixability of an image deteriorates in some cases. From the viewpoint that an image having high fixability is obtained, the dynamic surface tension of the ink is preferably 36.0 mN/m or less, more preferably 35.0 mN/m or less.

As described above, the ink of the present invention contains the pigment, the water-soluble organic solvent, and the surfactant. Next, the components constituting the ink of the present invention are described.

(Pigment)

Examples of the kind of the pigment (pigment particles) include an inorganic pigment, such as carbon black, and an organic pigment, and any one of the known pigments that may be used in inks may be used. Pigments that can be dispersed in water, such as a self-dispersible pigment and a resin-dispersed pigment to be described below, are each preferred as the pigment.

(Self-Dispersible Pigment)

The self-dispersible pigment means a pigment having at least one kind of hydrophilic group bonded directly or via another atomic group (—R—) to the surface of each pigment particle. Examples of the hydrophilic group include a carboxylic acid group (—COOM), a sulfonic acid group (—SO$_3$M), and a phosphonic acid group (—PO$_3$HM or —PO$_3$M$_2$). In the formulae, "M" preferably represents a hydrogen atom, an alkali metal, ammonium, or an organic ammonium. A hydrophilic group in which "M" represents an alkali metal, such as lithium, sodium, or potassium, is more preferred because the ejection stability of the ink is improved as compared to the case of such a hydrophilic group that "M" in the formulae represents ammonium or an organic ammonium.

Examples of the other atomic group (—R—) include an alkylene group having 1 to 12 carbon atoms, a substituted or unsubstituted phenylene group, and a substituted or unsubstituted naphthylene group. A plurality of phosphonic acid groups may be bonded to a carbon atom of the other atomic group (—R—). A self-dispersible pigment (bisphosphonic acid-based self-dispersible pigment) having a bisphosphonic acid group bonded directly or via another atomic group to the surface of each pigment particle is more preferably used as the self-dispersible pigment. The form of the hydrophilic groups in the ink may be any one of the following forms: a state in which part of the groups are dissociated and a state in which all of the groups are dissociated.

A suitable self-dispersible pigment is, for example, a pigment (self-dispersible inorganic pigment) having a hydrophilic group bonded directly or via another atomic group to the surface of each of the particles of an inorganic pigment, such as carbon black. A self-dispersible inorganic pigment (self-dispersible carbon black) in which the inorganic pigment is carbon black is, for example, a product available under the trade name "CAB-O-JET 200", "CAB-O-JET 300", "CAB-O-JET 352K", or "CAB-O-JET 400" (manufactured by Cabot).

A pigment (self-dispersible organic pigment) having a hydrophilic group bonded directly or via another atomic group to the surface of each organic pigment particle is also given as a suitable self-dispersible pigment. A pigment species in the self-dispersible organic pigment is, for example, a cyan pigment, a magenta pigment, or a yellow pigment. A copper phthalocyanine pigment is preferred as the cyan pigment. Specific examples thereof include C.I. Pigment Blue 1, 2, 3, 15, 15:2, 15:3, 15:4, 16, 22, and 60. Examples of the self-dispersible cyan pigment include products available under the trade names "CAB-O-JET 250C", "CAB-O-JET 450C", and "CAB-O-JET 554B" (all of which are manufactured by Cabot). A quinacridone pigment is preferred as the magenta pigment. Specific examples thereof include C.I. Pigment Red 5, 7, 12, 48, 48:1, 57, 112, 122, 123, 146, 168, 184, 202, and 207. Examples of the self-dispersible magenta pigment include products available under the trade names "CAB-O-JET 260M", "CAB-O-JET 265M", and "CAB-O-JET 465M" (ail of which are manufactured by Cabot). An azo pigment is preferred as the yellow pigment. Specific examples thereof include C.I. Pigment Yellow 12, 13, 14, 16, 17, 74, 83, 93, 95, 97, 98, 114, 128, 129, 151, and 154. Examples of the self-dispersible yellow pigment include products available under the trade names "CAB-O-JET 270Y", "CAB-O-JET 470Y", and "CAB-O-JET 740Y" (all of which are manufactured by Cabot).

When a self-dispersible pigment is used as the pigment, the content of the self-dispersible pigment in the ink is preferably 0.1 mass % or more to 10.0 mass % or less, more preferably 1.0 mass % or more to 7.0 mass % or less based on the total mass of the ink. When the content of the self-dispersible pigment in the ink is 0.1 mass % or more (more preferably 1.0 mass % or more), an increasing effect on the optical density of an image is sufficiently obtained with ease. In addition, when the content of the self-dispersible pigment in the ink is 10.0 mass % or less (more preferably 7.0 mass % or less), the ejection stability of the ink is sufficiently obtained with ease.

(Resin-Dispersed Pigment)

The resin-dispersed pigment means a pigment dispersed by a dispersant made of a resin different from pigment particles (resin dispersant). Any one of the resin dispersants that have heretofore been used in inks (preferably ink jet inks) may be used as the resin dispersant. The resin dispersant is preferably water-soluble. The phrase "resin is water-soluble" as employed herein means that when the resin is neutralized with an alkali equivalent to its acid value, the resin is brought into a state of having no particle diameter in an aqueous medium.

Monomers at the time of the preparation of the resin dispersant are specifically, for example, the following monomers, and a resin synthesized by using at least two monomers out of the monomers is given as a resin constituting the resin dispersant. At this time, at least one of the monomers is preferably a hydrophilic monomer. Examples of the monomer that may be used include styrene, vinylnaphthalene, an aliphatic alcohol ester of an α,β-ethylenically unsaturated carhoxylic acid, acrylic acid, methacrylic acid, maleic acid, itaconic acid, fumaric acid, vinyl acetate, vinylpyrrolidone, and acrylamide, and derivatives thereof. Of those, acrylic acid or methacrylic acid is preferably used as the hydrophilic monomer. In particular, the resin constituting the resin dispersant is more preferably a copolymer having at least constituent units derived from both acrylic acid and (meth)acrylic acid. In addition, examples of the form of the resin include a block copolymer, a random copolymer, and a graft copolymer, and salts thereof. Further, a natural resin, such as rosin, shellac, or starch, may be used as the resin.

The weight-average molecular weight of the resin dispersant in terms of polystyrene measured by gel permeation chromatography (GPC) is preferably 1,000 or more to 30,000 or less, more preferably 3,000 or more to 15,000 or less. The acid value of the resin dispersant is preferably 50 mgKOH/g or more to 350 mgKOH/g or less, more preferably 80 mgKOH/g or more to 250 mgKOH/g or less. The use of the resin dispersant having an acid value within the range improves the dispersion stability of the pigment and the ejection stability of the ink. The acid value of the resin dispersant may be measured by potentiometric titration.

The resin-dispersed pigment is preferably such that the mass ratio (content of the pigment particles/content of the resin dispersant) of the content of the pigment particles to the content of the resin dispersant is 1.0 or more to 10.0 or less. Such resin-dispersed pigment can be satisfactorily dispersed in the ink.

The content of the resin-dispersed pigment (total content of the pigment particles and the resin dispersant) in the ink is preferably 0.1 mass % or more to 10.0 mass % or less, more preferably 1.0 mass % or more to 7.0 mass % or less based on the total mass of the ink. When the content of the resin-dispersed pigment in the ink is 0.1 mass % or more (more preferably 1.0 mass % or more), an increasing effect on the optical density of an image is sufficiently obtained with ease. In addition, when the content of the resin-dispersed pigment in the ink is 10.0 mass % or less (more preferably 7.0 mass % or less), the ejection stability of the ink is sufficiently obtained with ease.

(Surfactant)

The kind of the surfactant to be incorporated into the ink of the present invention is not particularly limited. Examples of the suitable surfactant include a nonionic surfactant, an anionic surfactant, a fluorine-based surfactant, an acetylene glycol-based surfactant, and a silicone-based surfactant. A commercial surfactant may be used in the ink.

Specific examples of the nonionic surfactant include products available under the following trade names: EMULGEN 103, 108, 123P, AMIET, and EMASOL (all of which are manufactured by Kao Corporation); NOIGEN, EPAN, and SOLGEN (all of which are manufactured by DKS Co., Ltd.); and NAROACTY, EMULMIN, and SANNONIC (all of which are manufactured by Sanyo Chemical Industries, Ltd.).

Specific examples of the anionic surfactant include products available under the following trade names: EMAL, LATEMUL, PELEX, NEOPELEX, and DEMOL (all of which are manufactured by Kao Corporation); and SUNNOL, LIPOLAN, LIPON, and LIPAL (all of which are manufactured by Lion Corporation).

Specific examples of the fluorine-based surfactant include products available under the following trade names: MEGA FACE F-114, F-410, F-440, F-447, F-553, and F-556 (all of which are manufactured by DIC Corporation); and Surflon S-211, S-221, S-231, S-233, S-241, S-242, S-243, S-420, S-661, S-651, and S-386 (all of which are manufactured by AGC Seimi Chemical Co., Ltd.).

Specific examples of the acetylene glycol-based surfactant include products available under the following trade names: Surfynol 104, 82, 420, 440, 465, 485, TG, and 2502, Dynol 604, and Dynol 607 (all of which are manufactured by Air Products and Chemicals, Inc.); OLFINE E1004, E1010, PD004, and EXP4300 (all of which are manufactured by Nissin Chemical Industry); Acetylenol EH, E40, E60, E81, E100, and E200 (all of which are manufactured by Kawaken Fine Chemicals Co., Ltd.).

Specific examples of the silicone-based surfactant include products available under the following trade names: FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, and 8616 ADDITIVE (all of which are manufactured by Dow Corning Toray Co., Ltd.); KF-6012, KF-6015, KF-6004, KF-6013, KF-6011, KF-6043, KP-104, 110, 112, 323, 341, and 6004 (all of which are manufactured by Shin-Etsu Chemical Co., Ltd.); and BYK-300/302, BYK-306, BYK-307, BYK-320, BYK-325, BYK-330, BYK-331, BYK-333, BYK-337, BYK-341, BYK-344, BYK-345/346, BYK-347, BYK-348, BYK-375, BYK-377, BYK-378, BYK-UV 3500, BYK-UV 3510, BYK-310, BYK-315, BYK-370, BYK-UV 3570, BYK-322, BYK-323, BYK-350, BYK-352, BYK-354, BYK-355, BYK-358N/361N, BYK-380N, BYK-381, BYK-392, BYK-340, BYK-SILCLEAN 3700, and BYK-DYN-WET 800 (all of which are manufactured by BYK).

One kind of the surfactants may be incorporated into the ink, or two or more kinds thereof may be incorporated into the ink. The content of the surfactant in the ink is preferably 0.6 mass % or more, and is more preferably 5.0 mass % or less based on the total mass of the ink. The content of the surfactant to be incorporated into the ink may be appropriately adjusted in accordance with, for example, the miscibility and washability of the ink, its wettability to the inner wall of a channel, and its ink jet ejectability.

(Water-Soluble Organic Solvent)

The ink of the present invention contains a water-soluble organic solvent. The term "water-soluble organic solvent" as employed herein means an "organic solvent having a solubility in water at 20° C. of 500 g/L or more." Any one of the known solvents that may be used in inks may be used as the water-soluble organic solvent. Examples of the water-soluble organic solvent include alcohols, glycols, alkylene glycols, polyethylene glycols, nitrogen-containing compounds, and sulfur-containing compounds. One kind of those water-soluble organic solvents may be used, or two or more kinds thereof may be used as required. The content of all the water-soluble organic solvents in the ink is preferably 50 mass % or less, more preferably 5 mass % or more to 45 mass % or less based on the total mass of the ink.

The ink preferably contains, as the water-soluble organic solvent, at least one kind selected from the group consisting of glycerin, ethylene glycol, diethylene glycol, triethylene glycol, tetraethylene glycol, a polyethylene glycol having a weight-average molecular weight of 2,000 or less, 1,2-hexanediol, 1,3-propanediol, 1,4-butanediol, and diglycerol. In the specification, a water-soluble organic solvent belonging to the group is hereinafter sometimes described as "first water-soluble organic solvent," and a water-soluble organic solvent except the first water-soluble organic solvent is hereinafter sometimes described as "other water-soluble organic solvent."

The total content of the first water-soluble organic solvent in the ink is preferably larger than the total content of the other water-soluble organic solvent therein, and in this case, only the first water-soluble organic solvent may be incorporated as a water-soluble organic solvent into the ink. In addition, the mass ratio of the total content of the first water-soluble organic solvent in the ink to the total content of the other water-soluble organic solvent therein is preferably 3 or more, more preferably 10 or more. Further, the total content of the first water-soluble organic solvent in the ink is preferably 50 mass % or less, more preferably 5 mass % or more to 45 mass % or less, still more preferably 10 mass % or more to 40 mass % or less based on the total mass of the ink.

The ink preferably contains water in addition to the water-soluble organic solvent. Deionized water (ion-exchanged water) is preferably used as the water. The content of the water in the ink is preferably 50 mass % or more to 90 mass % or less based on the total mass of the ink.

(Resin Particles)

The ink of one embodiment of the present invention preferably contains resin particles. The term "resin particles" as employed herein means "particles each formed of a resin that can be present in a dispersed state in an aqueous medium." The resin particles are more preferably at least one kind selected from the group consisting of polyurethane-based resin particles, acrylic resin particles, styrene-acrylic resin particles, fluorine-based resin particles, and silicone-based resin particles. Of those, polyurethane-based resin particles and acrylic resin particles are still more preferred.

A polyurethane-based resin constituting the resin particles is a polymer or a copolymer having a urethane bond, and is obtained by, for example, causing a polyol and a polyisocyanate to react with each other. An acrylic resin constituting the resin particles is a polymer or a copolymer having a constituent unit derived from an acrylic monomer, such as a (meth)acrylic acid alkyl ester or a (meth)acrylic acid alkyl amide, and is obtained by, for example, subjecting such monomer to emulsion polymerization. A styrene-acrylic resin constituting the resin particles is a copolymer having a constituent, unit derived from the acrylic monomer and a constituent unit derived from styrene, and is obtained by, for example, subjecting the acrylic monomer and styrene to emulsion polymerization. A fluorine-based resin constituting the resin particles is a polymer or a copolymer of a fluorine-containing olefin (fluoroolefin). A silicone-based resin constituting the resin particles is a polymer or a copolymer having a siloxane bond on its main skeleton. A commercial product may be suitably used as those resin particles.

The content of the resin particles in the ink is preferably 10.0 mass % or less based on the total mass of the ink. When the content of the resin particles in the ink is 10.0 mass % or less, the ejection stability of the ink is sufficiently obtained with ease. In addition, when the resin particles are incorporated into the ink, the content of the resin particles in the ink is preferably 0.1 mass % or more.

(Additives)

The ink of one embodiment of the present invention may contain various additives, such as a surfactant except the above-mentioned surfactant, a pH adjustor, a rust inhibitor, an antiseptic, a fungicide, an antioxidant, an anti-reduction agent, an evaporation accelerator, and a chelating agent, as required.

<Ink Cartridge>

An ink cartridge of the present invention includes an ink storage portion configured to store an ink. In addition, the ink of the present invention described above is stored in the ink storage portion. The ink storage portion may be, for example, an ink storage portion having: an ink storage chamber configured to store a liquid ink; and a negative pressure-generating member storage chamber configured to store a negative pressure-generating member configured to hold the ink in itself with a negative pressure. In addition, the ink cartridge may be an ink cartridge that does not include an ink storage chamber configured to store a liquid ink but includes an ink storage portion configured to hold the total amount of the ink with the negative pressure-generating member. Further, the ink cartridge may be an ink cartridge of a mode including the ink storage portion and a recording head.

<Image Recording Method>

An image recording method of the present invention includes an ink-applying step of applying the above-mentioned ink to a recording medium. The image recording method of one embodiment of the present invention preferably further includes a conveying step (also referred to as "transferring step") of conveying the recording medium, and preferably further includes a heating step of heating the recording medium having the ink applied thereto.

Figure 1:
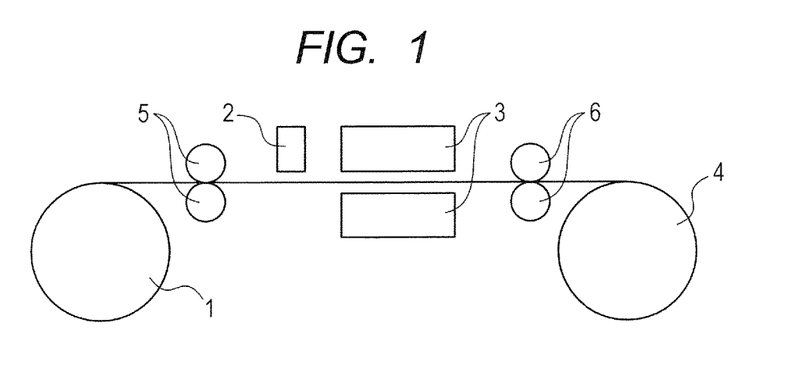
FIG. 1 is a schematic view for illustrating an example of an image recording apparatus to be used in an image recording method of the present invention.

FIG. 1 is a schematic view for illustrating an example of an image recording apparatus to be used in the image recording method of one embodiment of the present invention. In the image recording apparatus illustrated in FIG. 1, the following mode has been illustrated: recording is performed with a recording medium wound in a roll shape, and the recording medium is wound in a roll shape again. The apparatus includes the following respective units: a recording medium-supplying portion 1, an ink-applying portion 2, a heating portion 3, and a recording medium-recovering portion 4. The recording medium-supplying portion 1 is a unit for holding and supplying the recording medium wound in a roll shape. The ink-applying portion 2 is a unit for applying the ink to the recording medium, and includes, for example, a recording head. The heating portion 3 is a unit for heating the recording medium. The recording medium-recovering portion 4 is a unit for winding the recording medium having an image recorded thereon.

The recording medium is conveyed along a conveying path between the recording medium-supplying portion 1 and the recording medium-recovering portion 4 by a conveying portion, such as a pair of rollers or a belt, and is treated in the respective units. The image recording apparatus illustrated in FIG. 1 includes conveying rollers 5 and 6 as the conveying portion. For example, the following treatment may be performed: the recording medium wound in a roll shape by the conveying roller 6 and the recording medium-recovering portion 4 is supplied to another apparatus or the like, and the recording medium is cut into a desired size or bound into a book.

The speed at which the recording medium is conveyed in the conveying step (conveying speed of the recording medium) is more preferably 75 m/min or more, still more preferably 100 m/min or more. In addition, in the image recording method of one embodiment of the present invention, the ratio (conveying speed/recording resolution) (also referred to as "transferring speed/recording resolution") of the conveying speed of the recording medium to a recording resolution is preferably 0.0625 m/min·dpi or more, more preferably 0.125 m/min·dpi or more.

At the time of the conveyance of the recording medium, a tension is preferably applied to the recording medium. In other words, the image recording apparatus preferably includes a tension-applying unit for producing a tension. A specific method is as follows: it is sufficient that a tension-applying portion for applying a tension to the recording medium, a tension-adjusting portion for adjusting the tension of the recording medium, and the like be arranged in the conveying portion between the recording medium-supplying portion 1 and the recording medium-recovering portion 4 in FIG. 1. The application of the tension to the recording medium suppresses the swelling of the fibers of the recording medium due to the water in the ink. When the fibers of the recording medium swell, the volume of a gap between the fibers increases and hence the permeation rate of the ink increases. However, when the permeation rate of the ink increases, the ink is liable to deeply permeate in a direction perpendicular to the surface of the recording medium, and hence the optical density of an image is not sufficiently obtained in some cases. The application of the tension to the recording medium suppresses the swelling of the fibers of the recording medium due to the water in the ink as described above, and hence can suppress a reduction in optical density of the image due to an increase in permeation rate of the ink.

The tension to be applied to the recording medium is preferably 20 N/m or more. The application of a tension of 20 N/m or more to the recording medium more efficiently suppresses the swelling of the fibers of the recording medium due to the water in the ink. Further, the tension to be applied to the recording medium is more preferably 30 N/m or more, still more preferably 40 N/m or more and 100 N/m or less.

(Ink-Applying Step)

The ink-applying step is the step of applying the ink to the recording medium. An ink jet system is preferably adopted as a system for the application of the ink to the recording medium. That is, the image recording method of the present invention is preferably an ink jet recording method. The ink jet system may be a thermal ink jet system, or may be a piezo ink jet system. The thermal ink jet system is a system involving applying thermal energy to the ink to eject the ink from an ejection orifice of a recording head. In addition, the piezo ink jet system is a system involving ejecting the ink from the ejection orifice of the recording head with a piezoelectric element.

The recording head may be a serial type recording head, or may be a full-line type recording head. The serial type recording head is a recording head configured to scan a recording medium in a direction intersecting its conveying direction to record an image. In addition, the full-line type recording head is a recording head having a plurality of nozzles arrayed in a range covering the maximum width of the recording medium. The full-line type ink jet recording head is preferably used because an image can be recorded at higher speed. The full-line type ink jet recording head is preferably a recording head having a nozzle train arrayed in a direction perpendicular to the conveying direction of the recording medium. In addition, it is preferred that a plurality of full-line type ink jet recording heads be arranged for each ink type (typically, ink color), and the respective recording heads be sequentially arrayed along the conveying direction of the recording medium so as to be parallel to each other.

The amount of the ink to be applied to the recording medium in the ink-applying step is preferably 0.5 mg/cm$^2$ or more to 0.9 mg/cm$^2$ or less, more preferably 0.6 mg/cm$^2$ or more to 0.3 mg/cm$^2$ or less for each Ink type from the viewpoint of, for example, a drying property.

(Heating Step)

In the heating step, the heating is preferably performed so that the surface temperature of the recording medium having the ink applied thereto may be 70° C. or more. The expression "surface temperature of the recording medium having the ink applied thereto" as employed herein means the surface temperature of the recording medium at a position defined as follows: when the time point at which the ink is applied to the recording medium is defined as 0 second, a temperature at a position distant from the application position by a distance corresponding to 0.5 second of its conveyance is measured. For example, it is hypothesized that the speed at which the recording medium is conveyed is "V" m/min. When such hypothesis is formed, it is sufficient to measure the surface temperature of an ink recording region X in the recording medium at a position distant from the position at which the ink has been applied along its conveying direction by the movement distance of the recording region X, i.e., "(V×0.5)/60"m. The term "position at which the ink has been applied" in the case of the full-line type ink jet recording head means a position directly below the recording head. In each of Examples to be described later, the surface temperature of a recording medium was measured with a noncontact infrared thermometer digital radiation temperature sensor (trade name; "FT-H20", manufactured by Keyence Corporation) from a position distant from the surface of the recording medium in a substantially perpendicular direction by 10 cm.

In the heating step, the heating of the recording medium having the ink applied thereto is more preferably performed so that its surface temperature may be 80° C. or more. In addition, from the viewpoint of the prevention of the deformation of the recording medium due to heat, the heating is preferably performed so that the surface temperature may be 140° C. or less. Examples of a method of heating the recording medium may include: a method involving arranging a heater to heat the recording medium from its front surface side (side on which the ink is to be applied); a method involving heating the recording medium from its rear surface side; and a method involving heating the recording medium from its both surface sides.

In addition, in the heating step, when the recording medium is heated, the recording medium may be pressurized with, for example, a pressure roller. The pressurization of the recording medium can improve the fixability of an image. When the recording medium is pressurized, there is no need to perform the pressurization over the entire process of the heating step, and the pressurization may be performed only in part of the process of the heating step. In addition, the recording medium may be pressurized in many stages, or the image recording method may further include a pressurizing step after the heating step.

(Recording Medium)

Any one of the recording media that have heretofore been generally used may be used as the recording medium. Of those, a recording medium having an absorption rate constant Ka for water of 0.1 mL/(m²·ms$^{1/2}$) or more to 3.0 mL/(m²·ms$^{1/2}$) or less is preferred. In addition, the image recording method of one embodiment of the present invention more preferably includes an ink-applying step of applying the ink to a recording medium having an absorption rate constant Ka within the range to record an image by one pass.

Figure 2:
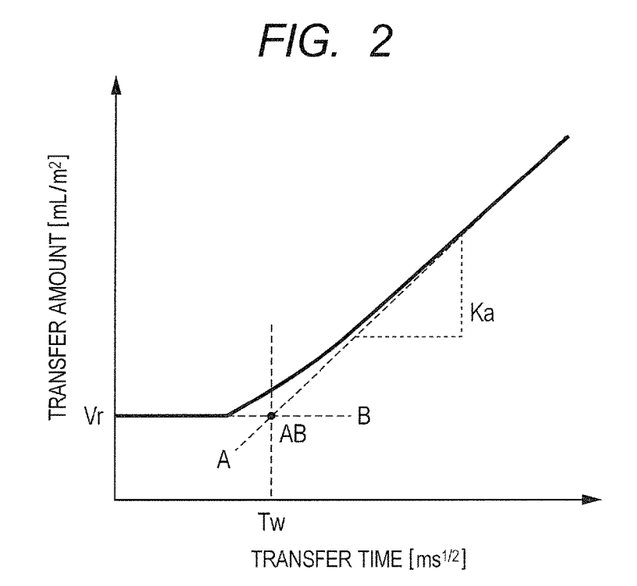
FIG. 2 is a graph for showing an example of an absorption curve for describing an absorption rate constant Ka of a recording medium for water.

The Bristow's method described in the "Explanation of Test Method of Liquid Absorptivity of Paper and Paperboard" of JAPAN TAPPI Paper Pulp Test Method No. 51 is used as a method of deriving the absorption rate constant Ka of the recording medium for water. Although detailed description about the Bristow's method is omitted because many commercial books each describe the method, the absorption rate constant Ka (mL/(m²·ms$^{1/2}$)) is defined by a wetting time Tw and a roughness index Vr (mL/m²). FIG. 2 is a graph for showing an example of an absorption curve describing the absorption rate constant Ka of the recording medium for water. The absorption curve shown in FIG. 2 is based on the following permeation model: the permeation of a liquid into a recording medium starts after a lapse of the wetting time Tw from the contact of the liquid with the recording medium. The inclination of a straight line after a lapse of the wetting time Tw is the absorption rate constant Ka. The absorption rate constant Ka corresponds to a speed at which the liquid permeates into the recording medium. As shown in FIG. 2, the wetting time Tw is calculated as follows: a point of intersection AB of an approximate straight line A based on a least-squares method for calculating the absorption rate constant Ka, and a straight, line B corresponding to "V=Vr" represented by a transfer amount V of the liquid and the roughness index Vr is determined, and a time taken to reach the point of intersection AB is defined as the wetting time. The temperature of the liquid (water) to be caused to permeate into the recording medium is set to 25° C. That is, the absorption rate constant Ka for water as employed herein is the absorption rate constant Ka for water at 25° C.

The thickness of the recording medium is not particularly limited. As described above, the ink to be used in the image recording method of one embodiment of the present invention can record an image suppressed in strike-through. Accordingly, in this method, a recording medium having a thickness of 0.1 mm or less, or moreover, 0.08 mm or less may also be suitably used.

The recording medium may be a recording medium cut into a desired size in advance, or may be an elongated recording medium wound in a roll shape, the recording medium being cut into a desired size after image recording. The elongated recording medium wound in a roll shape is more preferably used because a tension can be easily applied to the recording medium as described above.

According to one aspect of the present invention, there can be provided an ink capable of recording an image that achieves both an optical density and fixability at high levels, and that is suppressed in feathering and strike-through. According to another aspect of the present invention, there can be provided an ink cartridge and an image recording method each using the ink.

EXAMPLES

The present invention is more specifically described below by way of Examples and Comparative Examples. However, the present invention is by no means limited to Examples below without departing from the gist of the present invention. "Part(s)" and "%" in the following description are by mass unless otherwise stated.

<Pigment>

A bisphosphonic acid-based self-dispersible magenta pigment (trade name: "CAB-O-JET 465M", manufactured by Cabot, hereinafter sometimes described as "pigment 1") and the following resin-dispersed pigment (hereinafter sometimes described as "pigment 2") were used as pigments.

[Preparation of Pigment Dispersion Liquid]

A 500-mL recovery flask with a mechanical stirrer was loaded into the tank of an ultrasonic generator. 1 Gram of a styrene-acrylic acid random copolymer (acid value: 80 mgKOH/g) serving as a water-soluble resin dispersant and 120 mL of tetrahydrofuran serving as a solvent were loaded into the recovery flask, and the contents were stirred while an ultrasonic wave was applied thereto. In addition, 5 g of C.I. Pigment Blue 15:3 serving as a pigment (pigment particles) and 120 mL of tetrahydrofuran serving as a solvent were loaded into another container. The contents were mixed with a planetary stirring machine (manufactured by Kurabo Industries Ltd.) until the surfaces of the pigment particles were sufficiently wet with the solvent. After that, the mixture of the pigment particles and the solvent was added to the recovery flask, and was mixed with the water-soluble resin dispersant well. Next, an aqueous solution of potassium hydroxide was dropped and injected to perform phase inversion until the neutralization index of the water-soluble resin dispersant became 100%, and then premixing was performed for 60 minutes. After that, the resultant was dispersed with an atomization the resultant was dispersed with an atomization apparatus (trade name: "NANOMIZER NM2-L200AR", manufactured by Yoshida Kikai Co., Ltd.) for 2 hours to provide a dispersion liquid. Tetrahydrofuran was removed from the dispersion liquid by distillation with a rotary evaporator, and the concentration of the residue was adjusted. Thus, a dispersion liquid of the resin-dispersed pigment (pigment 2) having a content of the resin-dispersed pigment of 6.0% was obtained. The dispersion liquid of the resin-dispersed pigment had a mass ratio (content of the pigment/content of the water-soluble resin dispersant) of the content of the pigment (pigment particles) to the content of the water-soluble resin dispersant of 5.0.

<Preparation of Ink>

Respective components were mixed so as to have contents (each of which was represented in a mass % unit) shown in the upper stages of Tables 1 to 4 to be described later, and were sufficiently stirred to be dispersed, followed by filtration with a glass filter AP20 (trade name, manufactured by Merck Millipore Corporation). Thus, respective inks were prepared. The description "balance" representing the content of water in each table means such an amount that the total content of the respective components including the water becomes 100%. In addition, the contents (mass %) of a pigment and resin particles in each table are the contents (mass %) of the solid contents of the pigment and the resin particles in an ink, respectively. Abbreviations in the tables are as described, below.

(Surfactant)

"E103"; trade name; "EMULGEN 103" (manufactured by Kao Corporation, polyoxyethylene lauryl ether)

"E108": trade name; "EMULGEN 108" (manufactured by Kao Corporation, polyoxyethylene lauryl ether)

"E123P": trade name: "EMULGEN 103" (manufactured by Kao Corporation, polyoxyethylene lauryl ether)

"AE100": trade name; "ACETYLENOL E100" (manufactured by Kawaken Fine Chemicals Co., Ltd., acetylene glycol-based surfactant)

(Water-Soluble Organic Solvent)

"Gly": glycerin (manufactured by Kishida Chemical Co., Ltd.)

"12HD": 1,2-hexanediol (manufactured by Tokyo Chemical Industry Co., Ltd.)

"PEG1000": polyethylene glycol 1000 (polyethylene glycol having a weight-average molecular weight of 1,000, manufactured by Junsei Chemical Co., Ltd.)

(Resin Particles)

"W5661": trade name; "Takelac W-5661" (manufactured by Mitsui Chemicals, Inc., urethane resin emulsion)

"PDX7430": trade name; "Joncryl PDX-7430" (manufactured by BASF, acrylic resin emulsion)

Each of those resin particles formed a particle form even in a prepared ink.

The viscosity, static surface tension, and dynamic surface tension of each of the prepared inks at 25° C. were measured by methods to be described below. The results are shown in Tables 1 to 4 together with evaluation results to be described later.

[Measurement of Viscosity of Ink]

The viscosity (mPa·s) of each of the prepared inks at 25° C. was measured with a rotational viscometer (trade name: "RE80 Viscometer", manufactured by Toki Sangyo Co., Ltd.).

Each of the viscosities of the inks shown in Tables 1 to 4 fell within the range of from 5.0 mPa·s or more to 9.0 mPa·s or less.

[Measurement of Static Surface Tension of Ink]

The static surface tension (mN/m) of each of the prepared inks at 25° C. was measured with an automatic surface tensiometer utilizing the Wilhelmy method (trade name: "Model CBVP-A3", manufactured by Kyowa Interface Science Co., Ltd.) and a plate made of platinum.

[Measurement of Dynamic Surface Tension of Ink]

The dynamic surface tension (mN/m) of each of the prepared inks at 25° C. and a bubble life time of 150 msec was measured with a dynamic surface tensiometer utilizing the maximum bubble pressure method (trade name: "BP2-Mk2 Bubble Pressure Tensiometer", manufactured by KRUSS).

<Evaluation>

An ink jet recording apparatus having a construction illustrated in FIG. 1, the apparatus being mounted with a piezo type ink jet head (trade name: "KJ4", manufactured by Kyocera, nozzle density: 600 dpi), was used in the recording of an image. In addition, woodfree paper (trade name: "OK Prince High Quality", manufactured by Oji Paper Co., Ltd., basis weight: 64 g/m$^2$, thickness: 0.07 mm) was used as a recording medium. The recording was performed under the conditions of: a temperature of 25° C.; a relative humidity of 55%; an ink ejection frequency of 39 kHz; a conveying speed of the recording medium of 75 m/min; and an ink ejection volume at the time of the recording of about 13 pL per dot. The ratio (conveying speed/recording resolution) of the conveying speed of the recording medium to a recording resolution was 0.125 m/min·dpi, and the amount of an ink to be applied was 0.8 rug per square centimeter. In the ink jet recording apparatus, the condition under which one dot of an ink droplet having a mass of 13 ng is applied to a unit region measuring 1/600 inch by 1/600 inch at a resolution of 600 dpi×600 dpi is defined as a recording duty of 100%. In Examples, in the evaluation criteria of each of the following evaluation items, the levels "A" and "B" were defined as preferred levels, and the level "C" was defined as an unacceptable level.

(Fixability of Image)

A solid image having a size measuring 20 cm by 20 cm and a non-printing region having a width of 10 cm in the conveying direction of the recording medium (woodfree paper) were continuously recorded on the recording medium for 1 hour with the ink jet recording apparatus at a conveying speed of the recording medium of 75 m/min. After that, the surface of the conveying roller 6 (see FIG. 1) was observed, and the fixability of the image was evaluated in accordance with the following evaluation criteria.

A: Discoloration having a width of 20 cm was very slightly observed on the surface of the roller, but its boundary was not observed.

B: Slight discoloration having a width of 20 cm was present on the surface of the roller, and its boundary was faintly observed.

C: Strong discoloration having a width of 20 cm was present on the surface of the roller, and its boundary was clearly observed.

At the level C, the non-printing region printed immediately before the completion of the printing discolored. The level C was defined as an unacceptable level because a coloring material that had adhered to the roller once was considered to adhere again.

(Color Developability of Image)

A solid image (image sample 1) having a size measuring 20 cm by 20 cm, the image having a recording duty of 100%, was recorded on the recording medium (woodfree paper) with the ink jet recording apparatus under the condition of a conveying speed of the recording medium of 75 m/min. At this time, the ratio (conveying speed/recording resolution) of the conveying speed of the recording medium to a recording resolution was 0.125 m/min·dpi. In addition, the amount of an ink to be applied was 0.8 mg per square centimeter. The optical density of the image sample 1 was measured with a reflection densitometer (trade name: "RD-19I", manufactured by GretagMacbeth), and the color developability of the image was evaluated in accordance with the following evaluation criteria.

A: The optical density was 1.3 or more.
B: The optical density was 1.2 or more and less than 1.3.
C: The optical density was less than 1.2.

(Strike-Through of Image)

On a surface (rear surface) opposite to a surface (front surface) having the image sample 1 recorded thereon in the recording medium used in the evaluation of the "Color Developability of Image," the same image as the image sample 1 on the front surface was recorded. The image sample 1 on the rear surface was recorded at a position shifted from the position at which the image sample 1 on the front surface was projected onto the rear surface by 10 cm so that when the image sample 1 on the front surface and the image sample 1 on the rear surface were projected, their projected areas overlapped each other to have a common region measuring 10 cm by 20 cm. Then, the state of the strike-through of the image sample 1 recorded on the rear surface of the recording medium was evaluated through the visual observation of the front surface of the recording medium in accordance with the following evaluation criteria.

A: The image of the image sample 1 recorded on the rear surface of the recording medium was observed to slightly strike through to a region on the front surface of the recording medium where the image of the image sample 1 was not recorded.
B: The image of the image sample 1 recorded, on the rear surface of the recording medium was observed to strike through to a region on the front surface of the recording medium where the image of the image sample 1 was not recorded. However, a boundary portion between the image sample 1 recorded on the front surface of the recording medium and the image sample 1 recorded, on the rear surface of the recording medium that had struck through was able to be determined.
C: The image of the image sample 1 recorded on the rear surface of the recording medium was observed to strike through to a region on the front surface of the recording medium where the image of the image sample 1 was not recorded. In addition, it was difficult to determine a boundary portion between the image sample 1 recorded on the front surface of the recording medium and the image sample 1 recorded on the rear surface of the recording medium that had struck through.

(Feathering of Image)

An image sample 2 was produced by recording a 36-point ruled line on the recording medium (woodfree paper) with the ink jet recording apparatus at a conveying speed of the recording medium of 75 m/min. At this time, in a heating step, the surface temperature of the paper was regulated to 80° C. The sample was left to stand for 5 minutes at room temperature, and then its raggedness value Ra was measured. A personal image quality-evaluating system Personal IAS (manufactured by Quality Engineering Associates Inc.) was used in the measurement of the raggedness value Ra. Then, the extent of feathering was evaluated from the value for the Ra in accordance with the following evaluation criteria. In this evaluation, the extent of a fluctuation in width of the ruled line is measured with the evaluating system, and a smaller value for the Ra means that the width of the ruled line is constant, i.e., the extent to which the feathering is suppressed is more excellent.

A: The Ra was 13 or less.
B: The Ra was more than 13 and 15 or less.
C: The Ra was more than 15.

TABLE 1

Compositions (unit: mass %), characteristics, and evaluation results of inks

|  |  | Example 1 | Example 2 | Example 3 | Example 4 | Example 5 | Example 6 | Example 7 |
|---|---|---|---|---|---|---|---|---|
| Surfactant | E103 | 1.0 | 1.0 | 0.6 | 1.0 |  | 0.5 | 1.0 |
|  | E108 |  |  |  |  |  | 0.5 |  |
|  | E123P |  |  |  |  |  |  |  |
|  | AE100 |  |  |  |  | 1.0 |  |  |
| Organic solvent | Gly | 20.0 | 20.0 | 20.0 | 20.0 | 10.0 | 20.0 | 20.0 |
|  | 12HD |  |  |  | 9.0 | 2.8 | 3.0 | 7.0 |
|  | PEG1000 | 4.0 | 4.0 | 4.0 |  | 4.0 | 4.0 |  |
| Coloring material | Pigment 1 | 6.0 |  | 6.0 | 6.0 | 6.0 | 6.0 | 6.0 |
|  | Pigment 2 |  | 6.0 |  |  |  |  |  |
| Resin particles | W5661 | 7.0 | 7.0 | 7.0 | 7.0 | 7.0 | 3.0 | 7.0 |
|  | PDX7430 |  |  |  |  |  |  |  |
| Water |  | Balance | Balance | Balance | Balance | Balance | Balance | Balance |
| Viscosity (mPa · s) |  | 7.3 | 7.5 | 7.4 | 10.0 | 5.9 | 5.0 | 9.2 |
| Static surface tension (mN/m) |  | 31.9 | 31.7 | 34.5 | 30.5 | 34.6 | 30.6 | 30.8 |
| Dynamic surface tension (mN/m) |  | 34.5 | 34.2 | 36.0 | 32.2 | 36.5 | 35.7 | 33.9 |
| Evaluation result | Fixability | A | A | B | A | B | B | A |
|  | Color developability | A | A | A | A | A | A | A |

TABLE 1-continued

Compositions (unit: mass %), characteristics, and evaluation results of inks

|  | Example 1 | Example 2 | Example 3 | Example 4 | Example 5 | Example 6 | Example 7 |
|---|---|---|---|---|---|---|---|
| Strike-through | A | A | A | A | A | A | A |
| Feathering | A | A | A | B | A | B | B |

TABLE 2

Compositions (unit: mass %), characteristics, and evaluation results of inks

| | | Example 8 | Example 9 | Example 10 | Example 11 | Example 12 | Example 13 | Example 14 |
|---|---|---|---|---|---|---|---|---|
| Surfactant | E103 | | | 1.0 | 0.5 | | 1.0 | 0.6 |
| | E108 | | | | | | | |
| | E123P | 1.0 | 1.0 | | | 1.0 | | |
| | AE100 | | | | 0.5 | | | |
| Organic Solvent | Gly | 10.0 | 20.0 | 20.0 | 15.0 | 10.0 | 20.0 | 20.0 |
| | 12HD | 6.5 | 6.5 | 6.5 | 5.5 | 5.9 | | |
| | PEG1000 | 4.0 | 4.0 | 2.0 | 2.0 | 4.6 | 4.0 | 4.0 |
| Coloring material | Pigment 1 | 6.0 | | 6.0 | 6.0 | 6.0 | 6.0 | 6.0 |
| | Pigment 2 | | 6.0 | | | | | |
| Resin particles | W5661 | 7.0 | 7.0 | 7.0 | 7.0 | 7.0 | | |
| | PDX7430 | | | | | | 7.0 | 7.0 |
| Water | | Balance | Balance | Balance | Balance | Balance | Balance | Balance |
| Viscosity (mPa·s) | | 8.1 | 8.3 | 9.9 | 6.9 | 7.1 | 7.4 | 7.3 |
| Static surface tension (mN/m) | | 32.4 | 32.2 | 31.4 | 32.7 | 33.5 | 32.1 | 34.3 |
| Dynamic surface tension (mN/m) | | 35.4 | 35.1 | 34.2 | 35.1 | 36.9 | 34.7 | 35.7 |
| Evaluation result | Fixability | B | B | A | B | B | A | B |
| | Color developability | A | A | A | A | A | A | A |
| | Strike-through | A | A | A | A | A | A | A |
| | Feathering | A | A | A | A | A | A | A |

TABLE 3

Compositions (unit: mass %), characteristics, and evaluation results of inks

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Surfactant | E103 | 1.0 | 1.0 | | | | 1.0 | 0.5 |
| | E108 | | | 1.0 | | 1.0 | | |
| | E123P | | | | | | | |
| | AE100 | | | | 1.0 | | | |
| Organic Solvent | Gly | 20.0 | 20.0 | 20.0 | 10.0 | 20.0 | 20.0 | 20.0 |
| | 12HD | 3.1 | 3.0 | | 1.5 | | 14.0 | |
| | PEG1000 | 4.0 | 4.0 | 4.0 | 4.0 | 4.0 | | 4.0 |
| Coloring material | Pigment 1 | 6.0 | 6.0 | 6.0 | 6.0 | 6.0 | 4.0 | 6.0 |
| | Pigment 2 | | | | | | | |
| Resin particles | W5661 | 7.0 | 7.0 | 0.5 | 7.0 | 1.0 | 6.0 | 7.0 |
| | PDX7430 | | | | | | | |
| Water | | Balance | Balance | Balance | Balance | Balance | Balance | Balance |
| Viscosity (mPa·s) | | 8.4 | 8.3 | 3.3 | 5.1 | 3.4 | 15.0 | 7.2 |
| Static surface tension (mN/m) | | 28.5 | 34.1 | 29.3 | 35.5 | 31.1 | 29.4 | 36.0 |
| Dynamic surface tention (mN/m) | | 29.7 | 37.5 | 36.8 | 37.7 | 38.8 | 31.8 | 36.5 |
| Evaluation result | Fixability | A | C | B | C | C | A | C |
| | Color developability | C | A | A | A | A | B | A |
| | Strike-through | C | A | A | A | A | B | A |
| | Feathering | C | A | C | A | A | C | A |

TABLE 4

Compositions (unit: mass %), characteristics, and evaluation results of inks

|  |  | Comparative Example 8 | Comparative Example 9 |
|---|---|---|---|
| Surfactant | E103 | 1.0 |  |
|  | E108 |  |  |
|  | E123P |  |  |
|  | AE100 |  | 1.0 |
| Organic solvent | Gly | 20.0 | 10.0 |
|  | 12HD | 12.0 |  |
|  | PEG1000 |  | 4.0 |
| Coloring material | Pigment 1 |  | 6.5 |
|  | Pigment 2 | 4.0 | 7.0 |
| Resin particles | W5661 | 6.0 | 7.0 |
|  | PDX7430 |  |  |
| Water |  | Balance | Balance |
| Viscosity (mPa·s) |  | 12.3 | 5.0 |
| Static surface tension (mN/m) |  | 29.2 | 36.4 |
| Dynamic surface tension (mN/m) |  | 31.5 | 38.7 |
| Evaluation result | Fixability | A | C |
|  | Color developability | B | A |
|  | Strike-through | B | A |
|  | Feathering | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010907, filed Jan. 22, 2016, and Japanese Patent Application No, 2016-086817, filed Apr. 25, 2016, which are hereby incorporated by reference herein in their entirety.

What is claimed is:

1. An ink comprising:
a pigment;
a water-soluble organic solvent; and
a surfactant,
wherein the ink has a viscosity of 5 mPa·s or more at 25° C.,
wherein a static surface tension of the ink as measured at 25° C. using a Wilhelmy method is from 31.0 mN/m to 35.0 mN/m, and
wherein a dynamic surface tension of the ink as measured at 25° C. using a maximum bubble pressure method is from 30.5 mN/m to 37.0 mN/m when a bubble life time is 150 msec.

2. The ink according to claim 1, wherein a content of the surfactant is 0.6 mass % or more based on a total mass of the ink.

3. The ink according to claim 1, further comprising at least one kind of resin particles selected from the group consisting of urethane-based resin particles, acrylic resin particles, styrene-acrylic resin particles, fluorine-based resin particles, and silicone-based resin particles.

4. The ink according to claim 1, wherein the pigment is one of (i) a resin-dispersed pigment in which a mass ratio of the content of particles of the pigment to the content of a resin dispersant is from 1.0 to 10.0, or (ii) a self-dispersible pigment in which a bisphosphonic acid group is bonded directly or via another atomic group to a surface of particles of the pigment.

5. An ink cartridge comprising,
an ink; and
an ink storage portion storing the ink,
wherein the ink is the ink according to claim 1.

6. An image recording method comprising an ink-applying step of applying an ink to a recording medium,
wherein the ink is the ink according to claim 1.

7. The image recording method according to claim 6, wherein a ratio (transferring speed/recording resolution) of a transferring speed of the recording medium to a recording resolution is 0.125 m/mim·dpi or higher.

8. The image recording method according to claim 6, wherein the recording medium has a thickness of 0.1 mm or less.

9. The image recording method according to claim 6, wherein the amount of ink applied to the recording medium ranges from 0.6 mg/cm$^2$ to 0.8 mg/cm$^2$, for each ink type.

10. The ink according to claim 1, wherein the ink has the viscosity of 5.5 mPa·s or more to 17.0 mPa·s or less at 25° C.

11. The ink according to claim 1, wherein the content of the surfactant in the ink is 0.6 mass % or more to 5.0 mass % or less based on the total mass of the ink.

12. The ink according to claim 1, further comprising water,
wherein the content of the water in the ink is 50 mass % or more to 90 mass % or less based on the total mass of the ink.

13. The ink according to claim 1, wherein the dynamic surface tension of the ink as measured at 25° C. using a maximum bubble pressure method is from 31.5 mN/m to 37.0 mN/m when a bubble life time is 150 msec.

14. The image recording method according to claim 6, wherein, in the ink-applying step, the ink is applied by a full-line type recording head.

* * * * *